United States Patent
Sawai

(10) Patent No.: US 10,619,563 B2
(45) Date of Patent: Apr. 14, 2020

(54) CONTROL DEVICE FOR HYBRID VEHICLE

(71) Applicant: TOYOTA JIDOSHA KABUSHIKI KAISHA, Toyota-shi, Aichi-ken (JP)

(72) Inventor: Osamu Sawai, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 351 days.

(21) Appl. No.: 15/834,246

(22) Filed: Dec. 7, 2017

(65) Prior Publication Data

US 2018/0163618 A1    Jun. 14, 2018

(30) Foreign Application Priority Data

Dec. 12, 2016 (JP) ................................. 2016-240327

(51) Int. Cl.
*F02B 65/00* (2006.01)
*B60W 10/06* (2006.01)
(Continued)

(52) U.S. Cl.
CPC .............. *F02B 65/00* (2013.01); *B60K 6/445* (2013.01); *B60W 10/06* (2013.01); *B60W 10/08* (2013.01);
(Continued)

(58) Field of Classification Search
CPC ........ F02B 65/00; B60K 6/445; B60W 10/06; B60W 10/08; B60W 20/00; B60W 20/50; B60W 2510/224; B60W 2550/12; Y02T 10/52; Y02T 10/6217; Y02T 10/6239; Y02T 10/6286; Y02T 10/7077
See application file for complete search history.

(56) References Cited

U.S. PATENT DOCUMENTS 3,719,881 A * 3/1973 Shibata .................... B60K 6/46
                                                       322/11
3,904,883 A * 9/1975 Horwinski ............... B60K 6/26
                                                       290/50
(Continued)

FOREIGN PATENT DOCUMENTS

JP        2010-115075 A      5/2010
JP        2015-209043 A     11/2015
(Continued)

*Primary Examiner* — Khoi H Tran
*Assistant Examiner* — Jonathan J Pitts
(74) *Attorney, Agent, or Firm* — Oliff PLC

(57) ABSTRACT

An engine is stopped after a battery is charged by a first motor-generator driven by the engine when a condition in which freezing of condensed water in an exhaust pipe is expected to occur is satisfied after an ignition switch is turned OFF. By the engine operated during the charging of the battery, the condensed water accumulated in the exhaust pipe can be discharged to the outside of the exhaust pipe by the exhaust pressure of the exhaust gas. Accordingly, the condensed water is unlikely to remain in the exhaust pipe, and the freezing of the condensed water in the exhaust pipe can be suppressed even when parking continues for long under a low temperature atmosphere. The battery is charged by the first motor-generator, and thus the electric power of the battery can be used for traveling of a vehicle and fuel economy deterioration can be suppressed.

3 Claims, 5 Drawing Sheets

(51) Int. Cl.
 *B60W 10/08* (2006.01)
 *B60W 20/00* (2016.01)
 *B60K 6/445* (2007.10)
 *B60W 20/50* (2016.01)

(52) U.S. Cl.
 CPC ............ *B60W 20/00* (2013.01); *B60W 20/50* (2013.01); *B60W 2510/244* (2013.01); *B60W 2550/12* (2013.01); *Y02T 10/52* (2013.01); *Y02T 10/6217* (2013.01); *Y02T 10/6239* (2013.01); *Y02T 10/6286* (2013.01); *Y02T 10/7077* (2013.01)

(56) References Cited

U.S. PATENT DOCUMENTS

| | | | | |
|---|---|---|---|---|
| 5,713,426 | A * | 2/1998 | Okamura | B60K 1/04 180/65.245 |
| 5,945,808 | A * | 8/1999 | Kikuchi | B60K 6/46 320/132 |
| 5,962,927 | A * | 10/1999 | Inada | B60K 6/46 290/40 R |
| 6,885,920 | B2 * | 4/2005 | Yakes | A62C 27/00 701/22 |
| 6,945,035 | B2 * | 9/2005 | Hirooka | F01N 3/22 60/274 |
| 8,132,450 | B2 * | 3/2012 | Shibata | F01N 3/2066 73/114.71 |
| 8,652,699 | B2 * | 2/2014 | Suematsu | H01M 8/04291 429/400 |
| 2015/0274153 | A1 * | 10/2015 | Kanai | F02D 41/0025 477/3 |
| 2016/0298558 | A1 * | 10/2016 | Murata | F02D 41/0235 |
| 2016/0355090 | A1 * | 12/2016 | Murata | F01N 9/00 |

FOREIGN PATENT DOCUMENTS

| | | | |
|---|---|---|---|
| JP | 2015-732378 | * | 11/2015 |
| JP | 2016-089704 A | | 5/2016 |
| JP | 2016089704 A | * | 5/2016 |

\* cited by examiner

CONTROL DEVICE FOR HYBRID VEHICLE

CROSS-REFERENCE TO RELATED APPLICATIONS

This application claims priority to Japanese Patent Application No. 2016-240327 filed on Dec. 12, 2016, which is incorporated herein by reference in its entirety.

BACKGROUND

1. Technical Field

The disclosure relates to a control device for a hybrid vehicle.

2. Description of Related Art

Japanese Unexamined Patent Application Publication No. 2016-89704 (JP 2016-89704 A) discloses a technique for performing racing (idling) of an engine or motoring for allowing the engine to function as an air pump by driving by a motor in a state where the engine is not started when an ignition switch is turned OFF in a case where freezing of condensed water in an exhaust pipe of a hybrid vehicle is expected to occur.

SUMMARY

The motoring is to allow the engine to function as an air pump, and the condensed water accumulated in the exhaust pipe is discharged by its air pressure. However, the pressure in the exhaust pipe is less likely to increase as a result of the motoring than in a case where the engine is operated by its fuel being used, and the condensed water in the exhaust pipe cannot be completely discharged by the motoring alone in some cases. The condensed water may be frozen in a case where parking continues for long under a low temperature atmosphere in a state where the condensed water in the exhaust pipe remains in the exhaust pipe without being discharged.

The racing (idling) of the engine leads to fuel economy deterioration because it is engine operation not contributing to traveling of the vehicle.

The disclosure has been made in view of the above problems. The disclosure provides a control device for a hybrid vehicle with which both fuel economy deterioration and freezing of condensed water in an exhaust pipe can be suppressed.

An aspect of the disclosure relates to a control device for a hybrid vehicle provided with a motor, a battery, a generator, an engine, and an exhaust pipe. The motor is configured to drive wheels. The battery is configured to supply electric power to the motor. The generator is configured to charge the battery. The engine is configured to drive the generator. The exhaust pipe is configured to allow exhaust gas discharged from the engine by the engine being operated to circulate. The control device includes an electronic control unit. The electronic control unit is programmed to stop the engine after the battery is charged by the generator being driven by the engine in a case where a condition in which freezing of condensed water in the exhaust pipe is expected to occur is satisfied after an ignition switch of the hybrid vehicle is turned OFF.

The control device for the hybrid vehicle described above stops the engine after the battery is charged by the generator being driven by the engine in the case where the condition in which the freezing of the condensed water in the exhaust pipe is expected to occur is satisfied after the ignition switch of the hybrid vehicle is turned OFF.

By the engine being operated during the charging of the battery, the exhaust gas from the engine is discharged to the exhaust pipe. Accordingly, the condensed water accumulated in the exhaust pipe can be discharged to the outside of the exhaust pipe by the exhaust pressure of the exhaust gas. Accordingly, the condensed water is unlikely to remain in the exhaust pipe, and the freezing of the condensed water in the exhaust pipe can be suppressed even in a case where parking continues for long under a low temperature atmosphere.

The battery is charged by the driving of the generator by the engine. Accordingly, the electric power can be used for traveling of the vehicle, and fuel economy (energy efficiency) deterioration can be suppressed. With the control device for the hybrid vehicle, both fuel economy deterioration and the freezing of the condensed water in the exhaust pipe can be suppressed as described above.

The electronic control unit of the control device may be programmed to (i) determine that the condition in which the freezing of the condensed water in the exhaust pipe is expected to occur is satisfied once the ignition switch of the hybrid vehicle is turned OFF and (ii) perform discharging of the battery, allow the battery to be charged by the generator being driven by the engine and then stop the engine, when a charging amount of the battery is at least equal to a predetermined value.

The control device performs the discharging of the battery in the case where the charging amount of the battery is at least equal to the predetermined value as described above. Accordingly, the charging of the battery can still be performed, by the driving of the generator by the engine, even in a case where the battery has a small remaining capacity (even in a case where the battery is full, for example).

The electronic control unit of the control device may be programmed to perform the discharging of the battery by motoring the engine for allowing the engine to function as an air pump by driving using the electric power of the battery.

As described above, the control device allows the engine to function as an air pump during the discharging of the battery. Accordingly, the condensed water accumulated in the exhaust pipe can be discharged to the outside of the exhaust pipe by its air pressure.

By the engine being operated during the charging of the battery, the exhaust gas from the engine is discharged to the exhaust pipe. Accordingly, the condensed water accumulated in the exhaust pipe can be discharged to the outside of the exhaust pipe by the exhaust pressure of the exhaust gas.

With the control device, both drainage of the condensed water based on the functioning of the engine as an air pump and drainage of the condensed water based on the operation of the engine during the charging of the battery can be performed as described above. Accordingly, the condensed water can be drained in an improved manner.

The control device for a hybrid vehicle according to the disclosure has the configuration described above. Accordingly, it has an excellent effect by being capable of suppressing both fuel economy deterioration and freezing of condensed water in an exhaust pipe.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a block diagram illustrating a control device for the hybrid vehicle according to the present embodiment, objects controlled by the control device, and so on;

DETAILED DESCRIPTION OF EMBODIMENTS

Hereinafter, an example of an embodiment of the disclosure will be described based on accompanying drawings. The arrows RR, UP, and OUT appropriately shown in each of the drawings represent the rear, upper, and width-direction outer sides of a vehicle, respectively. In the following description, the front-rear direction of the vehicle and the up-down direction of the vehicle will be simply referred to as front-rear and up-down in some cases, respectively. The "vehicle side view" that is used in the following description refers to a case where the vehicle is seen from a first side in the width direction of the vehicle toward a second side and includes a case where some of its component parts are seen through.

Figure 1:
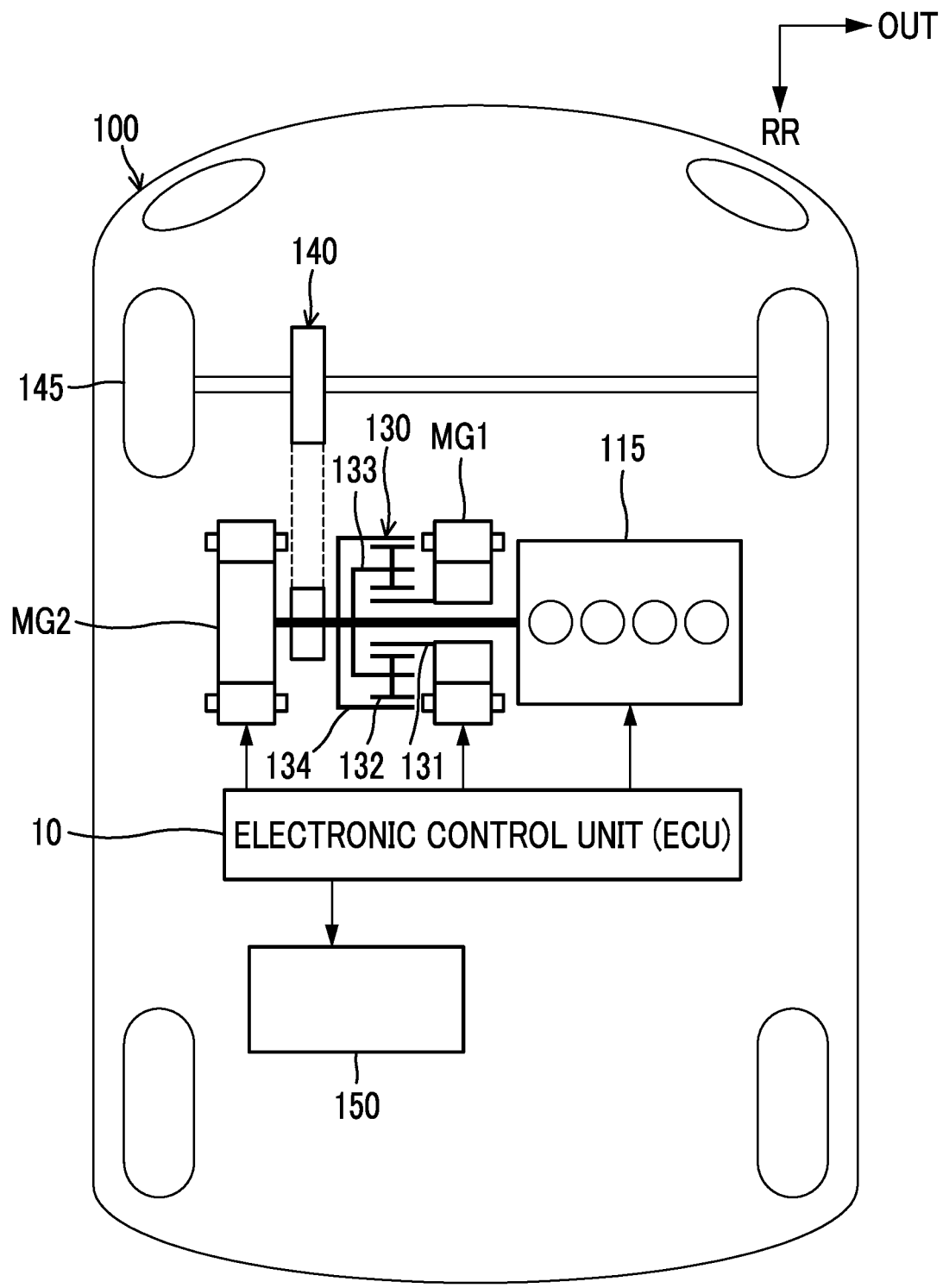
FIG. 1 is a schematic diagram illustrating a hybrid vehicle according to an embodiment of the disclosure.

A hybrid vehicle 100 to which a control device for a hybrid vehicle according to the present embodiment is applied will be described first. FIG. 1 is a schematic diagram illustrating the hybrid vehicle 100. As illustrated in FIG. 1, the hybrid vehicle 100 has an engine 115, a first motor-generator 1 (hereinafter, referred to as an "MG 1") as an example of a generator, a second motor-generator 2 (hereinafter, referred to as an "MG 2") as an example of a motor, a power split mechanism 130, and a speed reducer 140. The engine 115, the MG 1, and the MG 2 are controlled by an electronic control unit 10 (ECU).

The hybrid vehicle 100 travels by drive wheels 145 being driven by a driving force from at least one of the engine 115 and the MG 2. The engine 115, the MG 1, and the MG 2 are connected via the power split mechanism 130. The power that is generated by the engine 115 is split into two paths by the power split mechanism 130. One of the two paths is a path for driving the drive wheels 145 via the speed reducer 140. The other path is a path for generating electric power by driving the MG 1.

The engine 115 is operated by a hydrocarbon fuel such as gasoline and light oil being used and the power is output as a result of the operation. The engine 115 is stopped or started in accordance with a command from the electronic control unit 10. After the engine is started, engine control is executed in the form of fuel injection control, ignition control, intake air amount control, and so on for the engine 115 to be operated at operating points (torque and rotation speed) determined by the electronic control unit 10.

A three-phase alternating current rotary electric machine or the like constitutes each of the MG 1 and the MG 2. The MG 1 performs electric power generation with the power of the engine 115 split by the power split mechanism 130. A battery 150 is charged with the electric power that is generated by the MG 1 or the MG 2 is driven by the electric power that is generated by the MG 1. In addition, the MG 1 drives a crankshaft, which is an output shaft of the engine 115, by receiving the electric power from the battery 150. The driving of the output shaft of the engine 115 by the MG 1 is performed when the engine 115 is started and when motoring (described later) is performed for discharging of the battery 150.

The MG 2 drives the drive wheels 145 via the speed reducer 140 by using at least one of the electric power from the battery 150 and the electric power generated by the MG 1. During regenerative braking of the hybrid vehicle 100, the MG 2 is driven by the drive wheels 145 via the speed reducer 140, the MG 2 is operated as a generator, and the battery 150 is charged.

A planetary gear including a sun gear 131, a pinion 132, a carrier 133, and a ring gear 134 constitutes the power split mechanism 130. The pinion 132 is engaged with the sun gear 131 and the ring gear 134. The carrier 133 supports the pinion 132 such that the pinion 132 is rotatable. The sun gear 131 is connected to a rotary shaft of the MG 1. The carrier 133 is connected to the output shaft of the engine 115. The ring gear 134 is connected to a rotary shaft of the MG 2 and the speed reducer 140.

Basically, the hybrid vehicle 100 travels with the engine 115 stopped and by using nothing but the driving force of the MG 2 (low-load traveling) in an operation region where the efficiency of the engine 115 is low, examples of which include when the hybrid vehicle 100 is started and when the vehicle speed of the hybrid vehicle 100 is low. During normal traveling, the engine 115 is operated in a high-efficiency region and the power of the engine 115 is divided into two paths by the power split mechanism 130. The drive wheels 145 are driven by the power that is transmitted through one of the two paths. The MG 1 is driven and the electric power generation is performed by the power that is transmitted through the other path. The electric power generated by the MG 1 can be used as it is as the electric power for driving the MG 2. In other words, the MG 2 assists in the driving of the drive wheels 145 by using the electric power generated by the MG 1.

During high-speed traveling, the torque of the MG 2 is increased by the MG 2 being supplied with the electric power from the battery 150 as well. As a result, driving force addition can be performed on the drive wheels 145.

During deceleration, regenerative braking-based electric power generation is performed by the MG 2 driven by the drive wheels 145 functioning as a generator. The battery 150 is charged with the electric power that is recovered as a result of the regenerative braking-based electric power generation.

Figure 2:
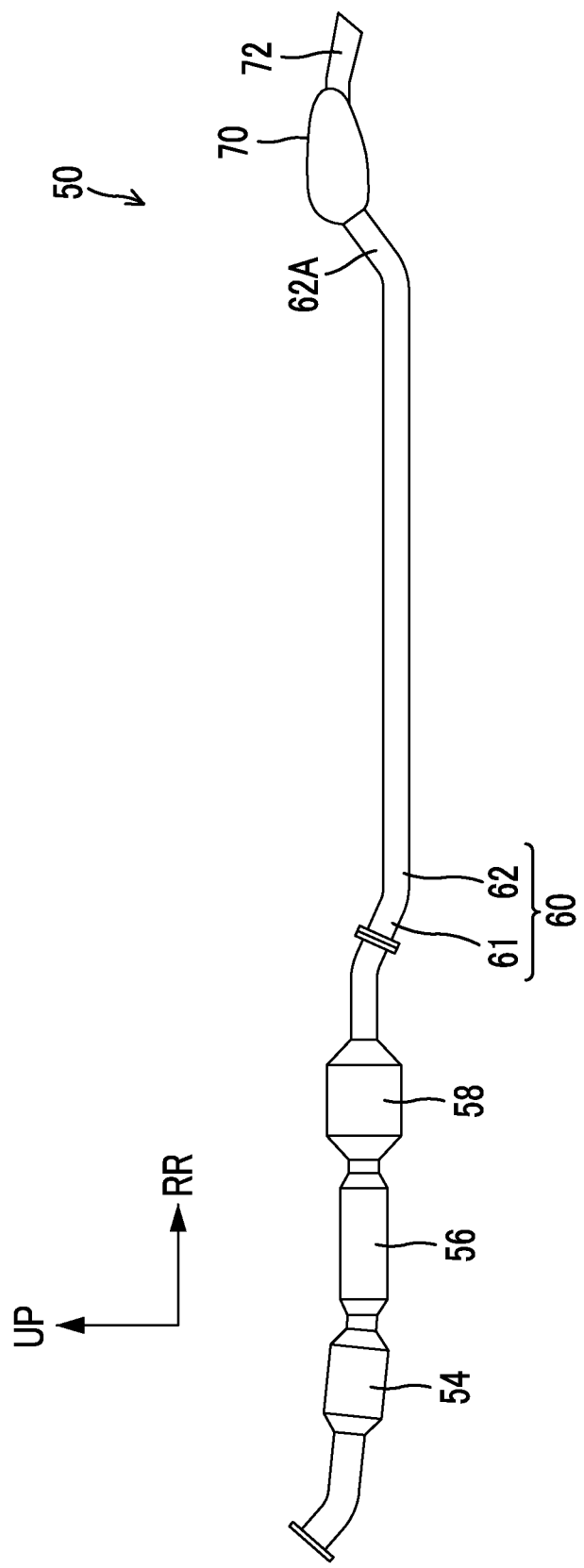
FIG. 2 is a schematic side view illustrating an exhaust pipe structure of the hybrid vehicle according to the present embodiment.

Hereinafter, an exhaust pipe structure 50 of the hybrid vehicle 100 will be described. FIG. 2 is a side view illustrating the exhaust pipe structure 50. In FIG. 2, the structure of the exhaust pipe structure 50 is illustrated in a simplified manner for easy understanding of the exhaust pipe structure 50 according to the present embodiment.

The exhaust pipe structure 50 is a pipe structure for discharging the exhaust gas that is discharged from the engine 115 (refer to FIG. 1) to the atmosphere (to the outside of the hybrid vehicle 100). Specifically, the exhaust pipe structure 50 is provided with an exhaust pipe 60 that has a first exhaust pipe 61 and a second exhaust pipe 62, a main muffler 70, and a discharge pipe 72 as illustrated in FIG. 2.

As illustrated in FIG. 2, the first exhaust pipe 61 is configured as a pipe that extends along the front-rear direction of the vehicle in vehicle side view. The first exhaust pipe 61 has a front end portion that is connected to a discharge port of the engine 115 (refer to FIG. 1). As a result, the exhaust gas that is discharged from the engine 115 as a result of the operation of the engine 115 flows in from the front end portion of the first exhaust pipe 61 and circulates to the rear side of the vehicle (to the rear end portion of the first exhaust pipe 61).

A catalytic converter 54, an exhaust heat recovery unit 56, and a submuffler 58 are disposed on the first exhaust pipe 61 in this order from the front side of the vehicle. The catalytic converter 54 has a function to control the exhaust gas by removing certain substances from the exhaust gas passing through the catalytic converter 54.

The exhaust heat recovery unit 56 has a function to recover the heat of the exhaust gas and reuse the heat by performing heat exchange with a heat medium such as water. The submuffler 58 has a function to reduce the exhaust sound of the exhaust gas.

As is the case with the first exhaust pipe 61, the second exhaust pipe 62 is configured as a pipe that extends along the front-rear direction of the vehicle in vehicle side view. The second exhaust pipe 62 has a front end portion that communicates with the rear end portion of the first exhaust pipe 61. As a result, the exhaust gas from the first exhaust pipe 61 flows in from the front end portion of the second exhaust pipe 62 and circulates to the rear side of the vehicle (to the rear end portion of the second exhaust pipe 62). The rear end side part of the second exhaust pipe 62 is an inclined portion 62A that has a gradient rising toward the rear side of the vehicle.

As illustrated in FIG. 2, the main muffler 70 is disposed behind and above the second exhaust pipe 62 in the vehicle. The inclined portion 62A of the second exhaust pipe 62 communicates with the main muffler 70. As a result, the exhaust gas flows into the main muffler 70 from the second exhaust pipe 62. The main muffler 70 has a function to reduce the exhaust sound of the exhaust gas flowing into the main muffler 70.

The discharge pipe 72 extends from the main muffler 70 to the rear side of the vehicle. The exhaust gas is discharged to the atmosphere from the main muffler 70 through the discharge pipe 72.

In some cases, the water vapor that is contained in the exhaust gas circulating through the exhaust pipe 60 (first exhaust pipe 61 and second exhaust pipe 62) is condensed as a result of a decline in temperature during the circulation through the exhaust pipe 60 or the like, condensed water is generated in the exhaust pipe 60 as a result of the condensation, and then the condensed water is accumulated in the exhaust pipe in the exhaust pipe structure 50. In the exhaust pipe structure 50, in particular, the condensation of the water vapor is likely to occur because the temperature of the exhaust gas is lowered by the heat of the exhaust gas being recovered by the exhaust heat recovery unit 56.

Once the way the hybrid vehicle 100 is standing is inclined backwards because of parking on a slope or the like, the condensed water accumulated in the exhaust pipe 60 flows to the inclined portion 62A of the second exhaust pipe 62 and is accumulated at the front end side part of the inclined portion 62A (where the gradient begins to rise). Once the parking continues for long under a low temperature atmosphere with the condensed water accumulated at the front end side part of the inclined portion 62A, the condensed water freezes and the exhaust pipe 60 is closed by the inclined portion 62A in some cases.

In the present embodiment, the electronic control unit 10 executes a processing procedure (described later) in this regard in order to control the driving of the engine 115 and the MG 1 and suppress the freezing of the condensed water in the exhaust pipe 60. The configuration of the electronic control unit 10 and the processing procedure executed by the electronic control unit 10 will be described below.

Figure 3:
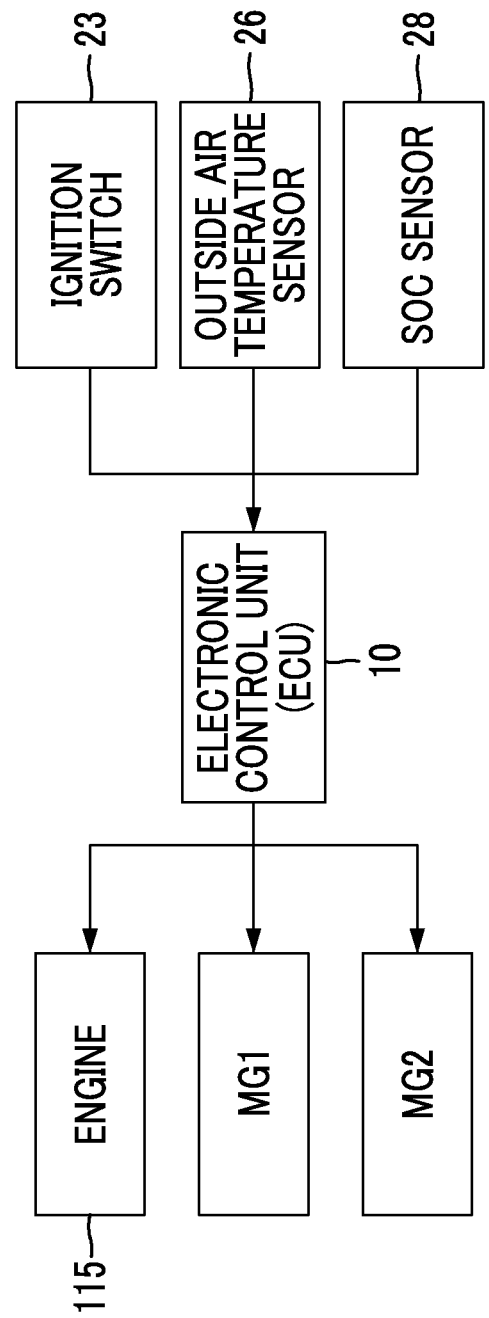

The control device for the hybrid vehicle is provided with the electronic control unit (ECU) 10 that controls the driving of the engine 115, the MG 1, and the MG 2. Each portion of the engine 115 (ignition device, fuel injection device, throttle valve actuator, and so on), the MG 1, and the MG 2 are connected to the electronic control unit 10 as illustrated in FIG. 3.

In the present embodiment, the electronic control unit 10 is comprehensively described as a common functional block. However, a plurality of electronic control units may also be used with the function of the electronic control unit 10 split.

An ignition switch 23 is connected to the electronic control unit 10, and the operation state of the ignition switch 23 is input to the electronic control unit 10. The ignition switch 23 is an operation switch for starting or stopping the engine 115. In other words, an ON operation is performed on the ignition switch 23 by an occupant as an operation for starting the engine 115. An OFF operation is performed on the ignition switch 23 by an occupant as an operation for stopping the engine 115.

An outside air temperature sensor 26 is also connected to the electronic control unit 10, and the outside air temperature that is detected by the outside air temperature sensor 26 is input to the electronic control unit 10 as a detection result. An SOC sensor 28 is also connected to the electronic control unit 10, and the charging amount (SOC) of the battery 150 that is detected by the SOC sensor 28 is input to the electronic control unit 10 as a detection result.

The electronic control unit 10 is capable of acquiring information such as the durations of the traveling of the hybrid vehicle 100 as a traveling history of the hybrid vehicle 100 from various devices in the hybrid vehicle 100 and capable of storing the durations of the past traveling of the hybrid vehicle 100 including the latest traveling of the hybrid vehicle 100.

Figure 4:
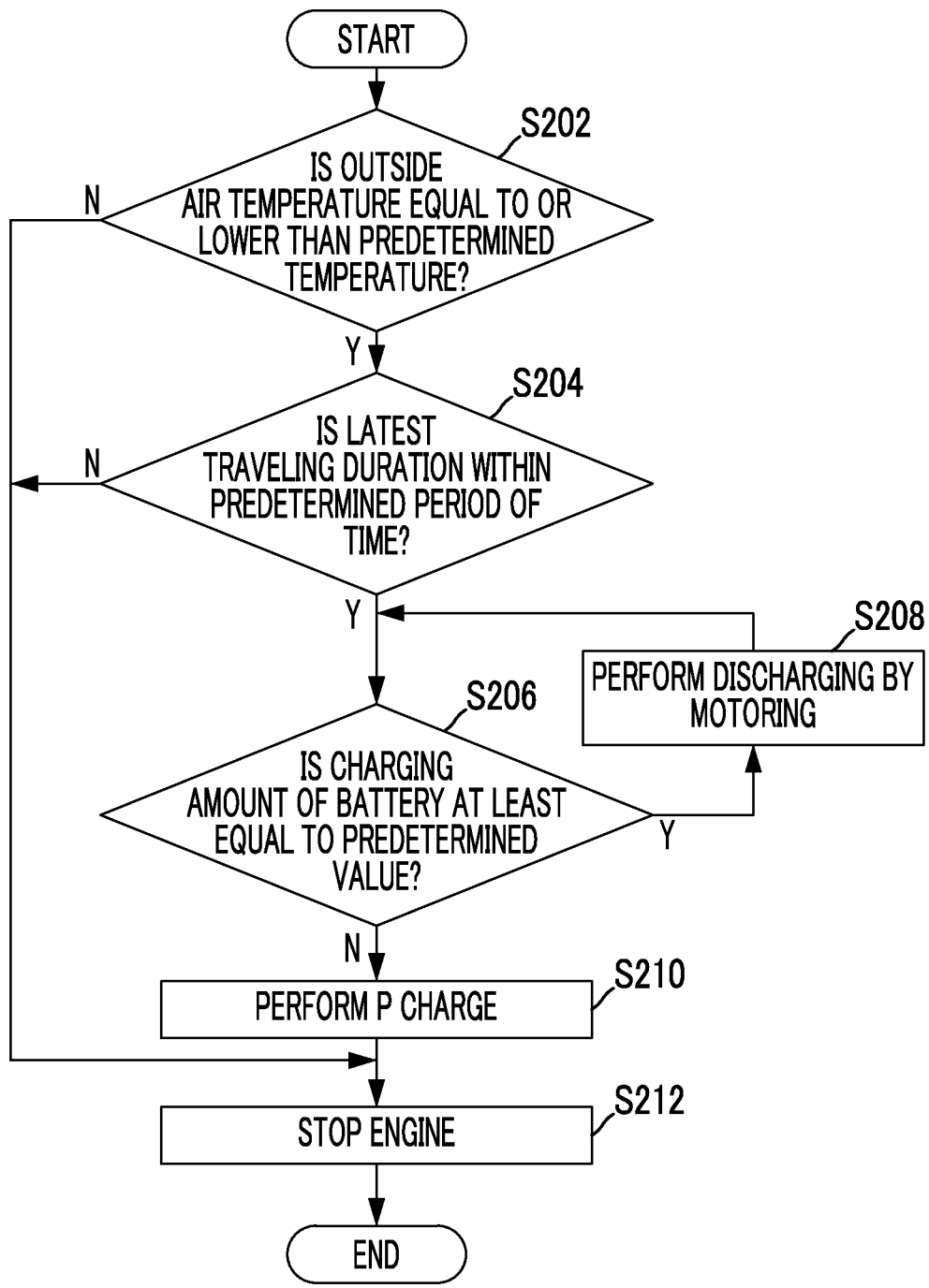
FIG. 4 is a flowchart illustrating an example of a processing procedure for controlling the driving of an engine and a first motor-generator according to the present embodiment.

Hereinafter, the processing procedure executed by the electronic control unit 10 will be described. The electronic control unit 10 controls the driving of the engine 115 and the MG 1 as exemplified below in order to suppress the freezing of the condensed water in the exhaust pipe 60. FIG. 4 is a flowchart illustrating this processing procedure. This processing procedure is initiated in a case where the ignition switch 23 is turned OFF. The "S" in the drawing is a simplified form of a "Step".

Once the ignition switch 23 is turned OFF, the electronic control unit 10 determines in Step 202, based on the result of the detection by the outside air temperature sensor 26, whether or not the outside air temperature is equal to or lower than a predetermined temperature determined in advance (such as 0° C.) as illustrated in FIG. 4. In a case where a positive determination is made in Step 202, the processing proceeds to Step 204. In a case where a negative determination is made in Step 202, the processing proceeds to Step 212.

Specifically, Step 202 is a step for determining whether or not the condensed water reaches a freezing temperature in a case where the condensed water remains in the exhaust pipe 60. The electronic control unit 10 may also use another method in order to determine in Step 202 whether or not the condensed water reaches the freezing temperature in the case where the condensed water remains in the exhaust pipe 60. For example, the electronic control unit 10 may determine whether or not the condensed water reaches the freezing temperature in Step 202 based on air temperature information (average air temperature, minimum air temperature) regarding the traveling region of the hybrid vehicle 100. The air temperature information is acquired by, for example, communication between the hybrid vehicle 100 and the outside of the vehicle. The hybrid vehicle 100 may not have the outside air temperature sensor 26 in this case.

In Step 204, the electronic control unit 10 determines, based on the traveling history, whether or not the latest traveling duration is within a predetermined period of time determined in advance (such as 10 minutes). In a case where a positive determination is made in Step 204, the processing proceeds to Step 206. In a case where a negative determination is made in Step 204, the processing proceeds to Step 212.

Specifically, Step 204 is a step for determining whether or not the condensed water remains in the exhaust pipe 60. In a case where the traveling duration is longer than the predetermined period of time, the normal traveling and the high-speed traveling in which the engine 115 is operated are performed and the condensed water accumulated in the exhaust pipe 60 is discharged to the outside of the exhaust pipe 60 by the exhaust pressure of the exhaust gas discharged from the engine 115. In a case where the traveling duration is within the predetermined period of time, in contrast, it is highly likely that the condensed water accumulated in the exhaust pipe 60 remains in the exhaust pipe 60 without being discharged from the exhaust pipe 60 with the low-load traveling in which the engine 115 is stopped and the traveling is performed by nothing but the driving force of the MG 2 mainly performed. The electronic control unit 10 determines that the condensed water remains in the exhaust pipe 60 in a case where the electronic control unit 10 determines in Step 204 that the latest traveling duration is within the predetermined period of time.

The electronic control unit 10 may refer to the past traveling durations as well as the latest traveling duration in Step 204. In addition, the electronic control unit 10 may determine whether or not the condensed water remains in Step 204 based on a traveling history other than the traveling durations. The maximum exhaust gas discharge amount, a fuel consumption amount, the maximum engine rotation speed, the maximum vehicle speed, the maximum exhaust gas temperature, and so on may be applied as the traveling history. Furthermore, the electronic control unit 10 may determine whether or not the condensed water remains in the exhaust pipe 60 in Step 204 based on information other than the traveling history. For example, a water detection sensor detecting the condensed water in the exhaust pipe 60 may be directly disposed in the exhaust pipe 60 for the electronic control unit 10 to determine whether or not the condensed water remains in the exhaust pipe 60 based on the result of the detection by the water detection sensor.

In this processing procedure, the electronic control unit 10 determines whether or not a condition in which the freezing of the condensed water in the exhaust pipe 60 is expected to occur is satisfied through Step 202 for determining whether or not the condensed water reaches the freezing temperature in the case where the condensed water remains in the exhaust pipe 60 and Step 204 for determining whether or not the condensed water remains in the exhaust pipe 60.

In Step 206, the electronic control unit 10 determines, based on the result of the detection by the SOC sensor 28, whether or not the charging amount of the battery 150 is at least equal to a predetermined value. In a case where a positive determination is made in Step 206, the processing proceeds to Step 208. In a case where a negative determination is made in Step 206, the processing proceeds to Step 210. The predetermined value is set to a value equal to or less than the value that is obtained by the charging amount which results from P charge (charging of the battery 150 in a state where the power from the engine 115 is not transmitted to the axles of the drive wheels 145, described later) being subtracted from the maximum chargeable amount of the battery 150.

In Step 208, the electronic control unit 10 performs motoring in order to discharge the battery 150. Then, the processing proceeds back to Step 206. In other words, motoring is repeated until a negative determination is made in Step 206.

During the motoring, electric power is supplied from the battery 150 to the MG 1 and the MG 1 drives the crankshaft that is the output shaft of the engine 115. As a result, air is discharged to the exhaust pipe 60 from the discharge port of the engine 115. In other words, the engine 115 functions as an air pump.

In Step 210, the electronic control unit 10 performs the P charge for charging the battery 150 by the engine 115 driving the MG 1 in the state where the power from the engine 115 is not transmitted to the axles of the drive wheels 145. Then, the processing proceeds to Step 212.

In Step 212, the electronic control unit 10 stops the engine 115 and the processing sequence is terminated.

According to this processing procedure, the engine 115 is stopped after the P charge for the battery 150 to be charged by the MG 1 being driven by the engine 115 is performed as described above in a case where the condition in which the freezing of the condensed water in the exhaust pipe 60 is expected to occur is satisfied after the ignition switch 23 of the hybrid vehicle 100 is turned OFF.

By the engine 115 being operated during the P charge for charging the battery 150, the exhaust gas from the engine 115 is discharged to the exhaust pipe 60. Accordingly, the condensed water accumulated in the exhaust pipe 60 can be discharged to the outside of the exhaust pipe 60 by the exhaust pressure of the exhaust gas. Accordingly, the condensed water is unlikely to remain in the exhaust pipe 60, and the freezing of the condensed water in the exhaust pipe 60 can be suppressed even in a case where parking continues for long under a low temperature atmosphere.

During the P charge operation, in particular, the load of the engine 115 is higher and the exhaust pressure of the exhaust gas is higher to the same extent as the electric power generation by the MG 1 than in a case where racing (simple idling not accompanied by the electric power generation by the MG 1) of the engine 115 is performed (comparative example). Accordingly, the condensed water accumulated in the exhaust pipe 60 can be effectively discharged to the outside of the exhaust pipe 60.

The electronic control unit 10 according to the present embodiment allows the battery 150 to be charged by the driving of the MG 1 by the engine 115. Accordingly, the electric power can be used for the traveling of the hybrid vehicle 100, and fuel economy (energy efficiency) deterioration can be suppressed.

As described above, fuel economy deterioration can be suppressed and the freezing of the condensed water in the exhaust pipe 60 can be suppressed by the electronic control unit 10 according to the present embodiment.

The electronic control unit 10 according to the present embodiment allows the battery 150 to be discharged in a case where the charging amount of the battery 150 is at least equal to the predetermined value. Accordingly, the charging of the battery can still be performed, by the driving of the MG 1 by the engine 115, even in a case where the battery 150 has a small remaining capacity (even in a case where the battery 150 is full, for example).

The electronic control unit 10 according to the present embodiment allows the engine 115 to function as an air pump during the motoring for discharging the battery 150. Accordingly, the condensed water accumulated in the exhaust pipe 60 can be discharged to the outside of the exhaust pipe 60 by its air pressure.

With the electronic control unit 10 according to the present embodiment, both drainage of the condensed water based on the functioning of the engine 115 as an air pump and drainage of the condensed water based on the operation of the engine 115 during the charging of the battery can be performed as described above. Accordingly, the condensed water can be drained in an improved manner.

Figure 5:
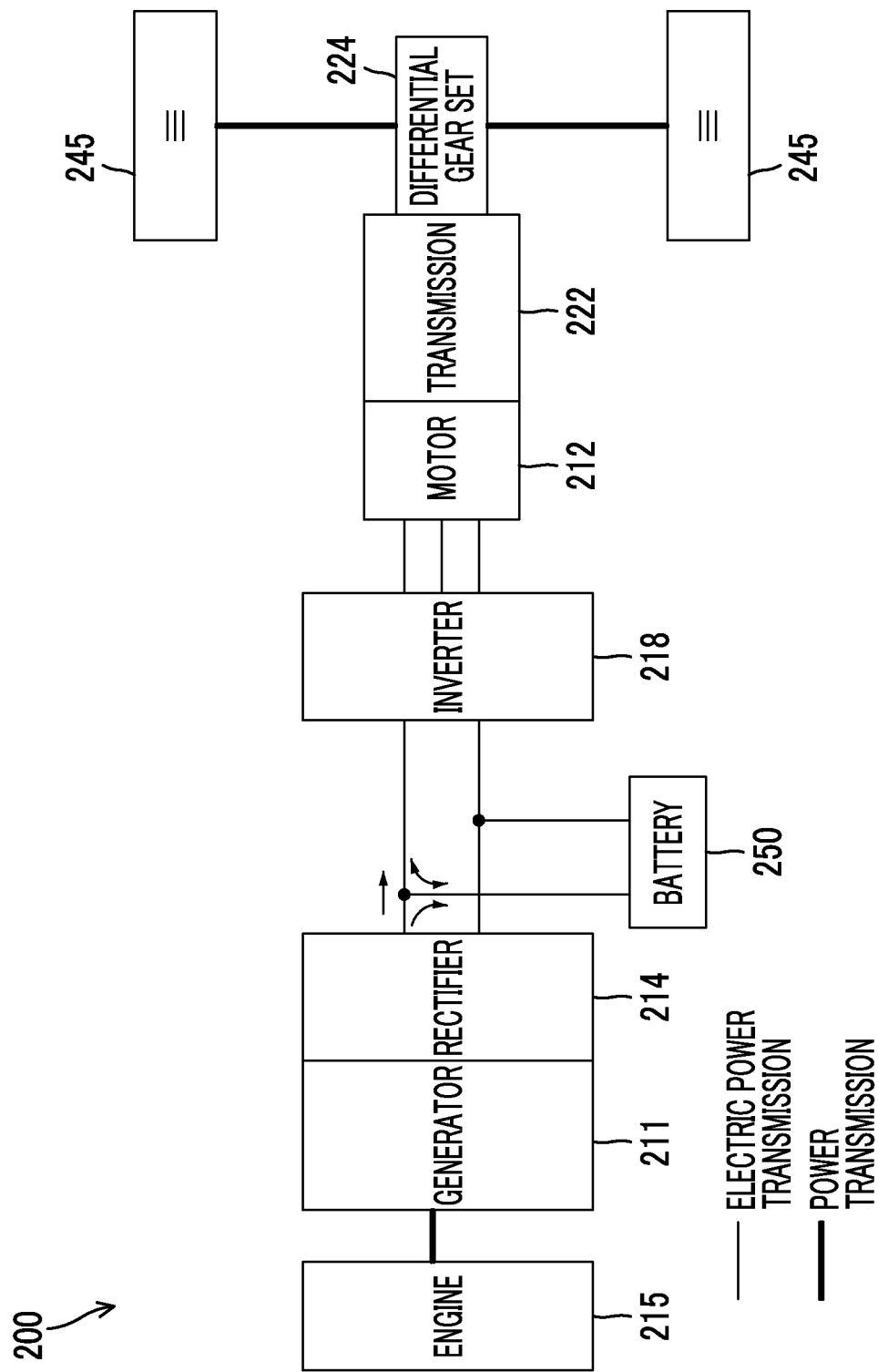
FIG. 5 is a schematic diagram illustrating a drive system of the hybrid vehicle according to a modification example of the present embodiment.

A modification example of the present embodiment will be described below. The electronic control unit 10 can also be applied to hybrid vehicles other than the hybrid vehicle 100 using the power split mechanism 130. The electronic control unit 10 may be applied to any hybrid vehicle insofar as its battery can be charged by the driving of its generator by its engine, examples of which include series hybrid-type hybrid vehicles. A hybrid vehicle 200 illustrated in FIG. 5 is an example of the series hybrid-type hybrid vehicles. The hybrid vehicle 200 illustrated in FIG. 5 is provided with an engine 215, a generator 211 driven by the engine 215, and a rectifier 214 rectifying the output of the generator 211. A battery 250 is connected in parallel to an output end of the rectifier 214. The battery 250 is, for example, a lead battery that has a six-cell module.

The rectifier 214 and the battery 250 are connected to a three-phase alternating current motor 212 via an inverter 218. The electric power that is output by the rectifier 214 is converted to a three-phase alternating current by the inverter 218 and is used as electric power for driving the motor 212 or electric power for charging the battery 250. The motor 212 drives drive wheels 245 via a transmission 222, a differential gear set 224, and so on.

As in the case of the hybrid vehicle 100, the electronic control unit 10 in the hybrid vehicle 200 illustrated in FIG. 5 stops the engine 215 after the generator 211 charges the battery 250 by the driving of the engine 215 in a case where the condition in which the freezing of the condensed water in the exhaust pipe is expected to occur is satisfied after the ignition switch of the hybrid vehicle 200 is turned OFF. The battery 250 is charged after being discharged in a case where the charging amount of the battery 250 is at least equal to a predetermined value during the charging of the battery 250. In the hybrid vehicle 200, the discharging of the battery 250 is performed by, for example, the motor 212 idling with electric power supplied from the battery 250 to the motor 212.

The disclosure is not limited to the embodiment described above and can be modified, altered, and improved in various forms without departing from the scope of the disclosure.

What is claimed is:

1. A control device for a hybrid vehicle, the hybrid vehicle including:
    a motor configured to drive wheels of the hybrid vehicle,
    a battery configured to supply electric power to the motor,
    a generator configured to charge the battery,
    an engine configured to drive the generator, and
    an exhaust pipe configured to allow exhaust gas discharged from the engine by an operation of the engine to circulate, the control device comprising:
    an electronic control unit programmed to stop the engine after charging the battery by driving the generator by the engine, when a condition in which freezing of condensed water in the exhaust pipe is expected to occur is satisfied after an ignition switch of the hybrid vehicle is turned OFF.

2. The control device according to claim 1, wherein the electronic control unit is programmed to:
    (i) determine that the condition in which the freezing of the condensed water in the exhaust pipe is expected to occur is satisfied once the ignition switch of the hybrid vehicle is turned OFF; and
    (ii) perform discharging of the battery, allow the battery to be charged by the generator driven by the engine and then stop the engine, when a charging amount of the battery is greater than or equal to a predetermined value.

3. The control device according to claim 2, wherein the electronic control unit is programmed to perform the discharging of the battery by motoring the engine for allowing the engine to function as an air pump by driving the engine by using the electric power of the battery.

* * * * *